(12) United States Patent
Xiong et al.

(10) Patent No.: US 10,671,080 B2
(45) Date of Patent: Jun. 2, 2020

(54) DATA PROCESSING METHOD FOR ROBOT AND ROBOT WITH THE SAME

(71) Applicant: UBTECH Robotics Corp, Shenzhen (CN)

(72) Inventors: Youjun Xiong, Shenzhen (CN); Jiawen Hu, Shenzhen (CN); Gaobo Huang, Shenzhen (CN); Caixia Li, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 67 days.

(21) Appl. No.: 16/205,248

(22) Filed: Nov. 30, 2018

(65) Prior Publication Data
US 2019/0196490 A1  Jun. 27, 2019

(30) Foreign Application Priority Data

Dec. 25, 2017 (CN) .............................. 2017 1 143002

(51) Int. Cl.
| | |
|---|---|
| B60L 9/00 | (2019.01) |
| G05D 1/02 | (2020.01) |
| G08C 23/04 | (2006.01) |
| G01C 21/20 | (2006.01) |
| G05D 1/00 | (2006.01) |

(52) U.S. Cl.
CPC ......... *G05D 1/0225* (2013.01); *G01C 21/206* (2013.01); *G05D 1/0022* (2013.01); *G05D 1/0217* (2013.01); *G08C 23/04* (2013.01); *G08C 2201/91* (2013.01)

(58) Field of Classification Search
CPC ... G05D 1/0225; G05D 1/0022; G01C 21/206
See application file for complete search history.

(56) References Cited

U.S. PATENT DOCUMENTS

2012/0185115 A1* 7/2012 Dean .................. F41H 7/005
                                                          701/2

\* cited by examiner

*Primary Examiner* — Adam M Alharbi

(57) ABSTRACT

The present disclosure provides a data processing method and a robot with the same. The robot includes: an electromagnetic wave receiver configured to receive at least two electromagnetic wave signals transmitted by at least two electromagnetic wave transmitters on a charging device within a preset time range; a demodulator configured to demodulate the at least two electromagnetic wave signals received by the electromagnetic wave receiver to obtain at least two corresponding electromagnetic wave demodulation data; a processor configured to determine electromagnetic wave demodulation control data based on the at least two obtained electromagnetic wave demodulation data and preset electromagnetic wave demodulation data; and a controller configured to move the robot according to the electromagnetic wave demodulation control data until the robot is docked at the charging device. In the above-mentioned manner, the robot is facilitated to select the plurality of electromagnetic wave demodulation data to smoothen the docking process.

13 Claims, 5 Drawing Sheets

US 10,671,080 B2

DATA PROCESSING METHOD FOR ROBOT AND ROBOT WITH THE SAME

CROSS REFERENCE TO RELATED APPLICATIONS

This application claims priority to Chinese Patent Application No. 201711430025.5, filed Dec. 25, 2017, which is hereby incorporated by reference herein as if set forth in its entirety.

BACKGROUND

1. Technical Field

The present disclosure relates to robot technology, and particularly to a data processing method for a robot and a robot with the same.

2. Description of Related Art

The automatic charging process of a robot includes: transmitting a signal continuously through a charging base, receiving the signal through a receiver of the robot, and finally causing the robot to find a charging position to charge.

In the prior art, there are various technologies for the robot to re-charge. Taking infrared rays as an example, since the coverage area of each infrared transmitter is limited, the charging bases is usually installed with a plurality of infrared transmitters so as to cover the area that the robot can reach. In order to avoid signal dead zones, there are overlapping coverage area(s) for the infrared signals transmitted by the plurality of infrared transmitters on the charging base.

However, the inventor of the present disclosure found in the long-term research and development that, when the robot is within the overlapping coverage area of the infrared signals, the infrared signals from two infrared transmitters may be simultaneously received, which affects the system to effectively find the charging position to charge.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the present disclosure will be clearly and completely described below with reference to the accompanying drawings and embodiments. Apparently, the described embodiments are only a part of the embodiments of the present disclosure, rather than all embodiments. All other embodiments obtained based on the embodiments of the present disclosure by those skilled in the art without creative efforts are all fall within the scope of the present disclosure.

Figure 1:
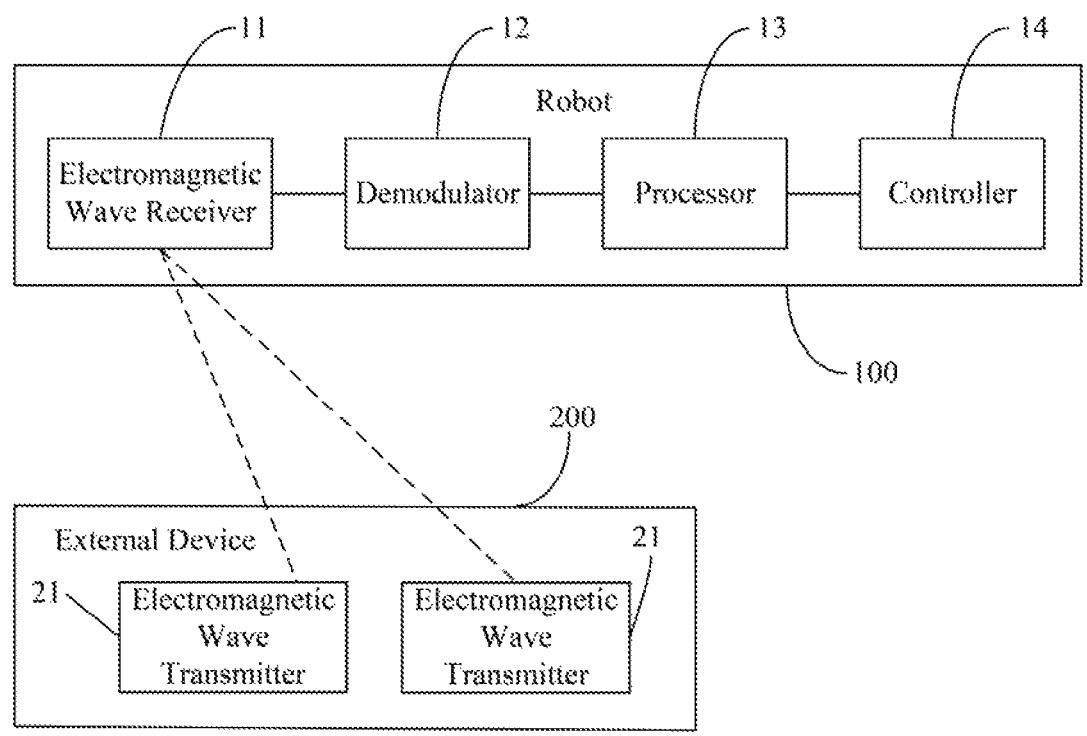
FIG. 1 is a schematic block of the structure of an embodiment of a robot according to the present disclosure.

FIG. 1 is a schematic block of the structure of an embodiment of a robot according to the present disclosure. As shown in FIG. 1, a robot 100 includes an electromagnetic wave receiver 11, a demodulator 12, a processor 13, and a controller 14.

The electromagnetic wave receiver 11 is disposed on the robot 100, which is configured to receive at least two electromagnetic wave signals transmitted by at least two electromagnetic wave transmitters 21 on an external device 200 within a preset time range. The at least two electromagnetic wave signals have overlapping coverage area(s).

The preset time range is set according to the actual situation. In general, the preset time range is a shorter time window such as 150 milliseconds or a time window of other values.

The external device 200 is provided with at least two electromagnetic wave transmitters 21, for example, two, three, four electromagnetic wave transmitters, or the like. The electromagnetic wave transmitter 21 may be: an infrared transmitter, a laser transmitter, an ultrasonic transmitter, or the like. The corresponding electromagnetic wave signal may be: an infrared signal, a laser signal, an ultrasonic signal, or the like. The corresponding electromagnetic wave receiver 11 may be an infrared receiver, a laser receiver, an ultrasonic receiver, or the like. In which, the amount of the electromagnetic wave receivers 11 may be one or more, for example, one, two, or the like.

In one embodiment, the external device 200 may be a charging device, a mobile terminal, a personal computing device, or the like.

The at least two electromagnetic wave transmitters 21 can transmit at least two electromagnetic wave signals, and the at least two electromagnetic wave signals have overlapping coverage area(s) to avoid the presence of a signal dead zone. When the robot is in the signal dead zone, the electromagnetic wave signal can not be received. The electromagnetic wave receiver 11 can receive the at least two electromagnetic wave signals within the preset time range.

The demodulator 12 is coupled to the electromagnetic wave receiver 11, which is configured to demodulate the at least two electromagnetic wave signals received by the electromagnetic wave receiver 11 so as to obtain at least two corresponding electromagnetic wave demodulation data.

After the electromagnetic wave receiver 11 receives the at least two electromagnetic wave signals within the preset time range, the at least two electromagnetic wave signals are transmitted to the demodulator 12 for the demodulator 12 to demodulate, that is, the demodulator 12 demodulates to obtain the at least two electromagnetic wave demodulation data within a certain time range.

The processor 13 is coupled to the demodulator 12, which is configured to determine electromagnetic wave demodulation control data based on the at least two obtained electromagnetic wave demodulation data and preset electromagnetic wave demodulation data.

The preset electromagnetic wave demodulation data refers to data set in advance for determining the electromagnetic wave demodulation control data. The preset electromagnetic wave demodulation data can be set by the user to facilitate the selection of the plurality of electromagnetic wave demodulation data, so that the robot 100 only needs to select the required data when the robot 100 is within the overlapping coverage area of the electromagnetic wave signals, thereby making the docking process of the robot 300 smoother.

The controller 14 is coupled to the processor 13, which is configured to move the robot 100 according to the electromagnetic wave demodulation control data until the robot 100 is docked at the external device 200.

After the processor 13 determines the electromagnetic wave demodulation control data, the controller 14 can control the robot 100 to move according to the electromagnetic wave demodulation control data until the robot 100 is docked at the external device 200, that is, an instruction of the external device 200 is completed, thereby avoiding system disorder, and enabling the robot to execute the instructions initiated by different external devices in an orderly manner, so that the robot 100 has good expandability and ease of use. The controller 14 moves the robot 100 toward a direction corresponding to the electromagnetic wave demodulation control data (e.g., the direction of the infrared transmitter from which the infrared signal corresponding to the electromagnetic wave demodulation control data is received) until the robot 100 is docked at the external device 200.

In one embodiment, the external device 200 is a charging device, and instruction of the charging device is to cause the robot 100 to dock at the charging device, so as to facilitate charging the robot.

In this embodiment, the robot includes: an electromagnetic wave receiver disposed on the robot, where the electromagnetic wave receiver is configured to receive at least two electromagnetic wave signals transmitted by at least two electromagnetic wave transmitters on an external device within a preset time range, where the at least two electromagnetic wave signals have overlapping coverage area(s); a demodulator coupled to the electromagnetic wave receiver, where the demodulator is configured to demodulate the at least two electromagnetic wave signals received by the electromagnetic wave receiver to obtain at least two corresponding electromagnetic wave demodulation data; a processor coupled to the demodulator, where the processor is configured to determine electromagnetic wave demodulation control data based on the at least two obtained electromagnetic wave demodulation data and preset electromagnetic wave demodulation data; and a controller coupled to the processor, where the controller is configured to move the robot according to the electromagnetic wave demodulation control data until the robot is docked at the external device. Because when the robot receives and demodulates the at least two electromagnetic wave signals within the preset time range to obtain the corresponding at least two electromagnetic wave demodulation data, the electromagnetic wave demodulation control data can be determined through the at least two electromagnetic wave demodulation data based on the preset electromagnetic wave demodulation data, thereby controlling the robot to move until the robot is docked at the external device (the instruction of the external device is completed). In this way, the robot is facilitated to select the plurality of electromagnetic wave demodulation data, thereby making the docking process of the robot smoother.

In one embodiment, the electromagnetic wave transmitter 21 is an infrared transmitter (see the infrared transmitter 211 in FIG. 2), the electromagnetic wave signal is an infrared signal. The electromagnetic wave receiver 11 is an infrared receiver (see the infrared receiver 111 in FIG. 3), and the electromagnetic wave demodulation data is infrared carrier data. The infrared signal can provide a more accurate positioning for the robot 100, while has a lower cost.

Furthermore, in one embodiment, the amount of the infrared transmitters is four, the amount of the infrared receivers is two, and two infrared receivers are disposed on a chassis of the robot 100.

For the charging device, for example, a charging station, in order not to affect the range of motion of the robot, the infrared transmitters are usually not exposed on the plane where the robot moves. In this case, the infrared receiver is disposed on the chassis of the robot for better receiving infrared signals. In this embodiment, the charging device 200 is provided with four infrared transmitters, and in order to better receive infrared signals, correspondingly, the robot 100 is provided with two infrared receivers.

Figure 2:
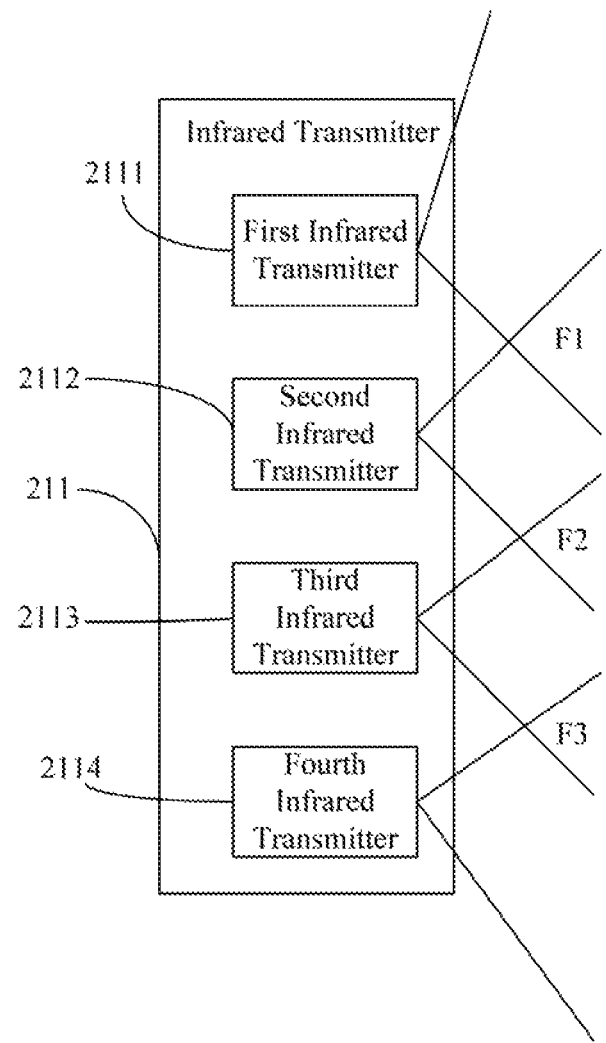
FIG. 2 is a schematic block of the structure of an infrared transmitter of an external device in the embodiment of the robot.

FIG. 2 is a schematic block of the structure of an infrared transmitter of an external device in the embodiment of the robot. As shown in FIG. 2, the infrared transmitter 211 includes a first infrared transmitter 2111, a second infrared transmitter 2112, a third infrared transmitter 2113, and a fourth infrared transmitter 2114. There is a first overlapping coverage area F1 between a first infrared signal transmitted by the first infrared transmitter 2111 and a second infrared signal transmitted by the second infrared transmitter 2112; there is a second overlapping coverage area F2 between the second infrared signal transmitted by the second infrared transmitter 2112 and a third infrared signal transmitted by the third infrared transmitter 2113; and there is a third overlapping coverage area F3 between the third infrared signal transmitted by the third infrared transmitter 2113 and a fourth infrared signal transmitted by the fourth infrared transmitter 2114.

In this embodiment, the infrared signals transmitted by the first infrared transmitter 2111, the second infrared transmitter 2112, the third infrared transmitter 2113, and the fourth infrared transmitter 2114 form three overlapping coverage areas, and the entire coverage area of the infrared signals is basically capable of covering the range of motion of the robot. In this way, it is possible to get an overage area as large as possible with a relatively small cost.

In one embodiment, demodulated data corresponding to the first infrared signal is first infrared carrier data, demodulated data corresponding to the second infrared signal is second infrared carrier data, demodulated data corresponding to the third infrared signal is third infrared carrier data, and demodulated data corresponding to the fourth infrared signal is fourth infrared carrier data.

In this embodiment, each infrared signal is modulated by a different carrier frequency before an infrared is transmitted. In this case, after demodulating by the demodulator, the corresponding demodulated data are the first infrared carrier data, the second infrared carrier data, the third infrared carrier data, and the fourth infrared carrier data, thereby distinguishing different corresponding infrared signals, that is, the first infrared signal, the second infrared signal, the third infrared signal, and the fourth infrared signal.

Figure 3:
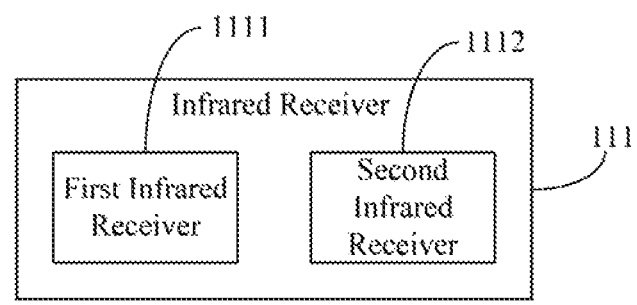
FIG. 3 is a schematic block of the structure of an infrared receiver in the embodiment of the robot.

FIG. 3 is a schematic block of the structure of an infrared receiver in the embodiment of the robot. As shown in FIG. 3, in this embodiment, the infrared receiver 111 includes a first infrared receiver 1111 and a second infrared receiver 1112.

The processor 13 is further configured to determine the electromagnetic wave demodulation control data as the second infrared carrier data, if the two electromagnetic wave demodulation data are the first infrared carrier data and the second infrared carrier data, and the infrared receiver 11 that receives the infrared signal is the first infrared receiver 1111 or the second infrared receiver 1112.

When the first infrared receiver 1111 or the second infrared receiver 1112 receives the first infrared signal and the second infrared signal, the two electromagnetic wave demodulation data are the first infrared carrier data and the second infrared carrier data, and the electromagnetic wave demodulation control data is determined to be the second infrared carrier data according to the preset electromagnetic wave demodulation data.

The processor 13 is further configured to determine the electromagnetic wave demodulation control data as the third infrared carrier data, if the two electromagnetic wave demodulation data is the third infrared carrier data and the fourth infrared carrier data, and the infrared receiver 111 that receives the infrared signal is the first infrared receiver 1111 or the second infrared receiver 1112.

When the first infrared receiver 1111 or the second infrared receiver 1112 receives the third infrared signal and the fourth infrared signal, the two electromagnetic wave demodulated data are the third infrared carrier data and the fourth infrared carrier data, and the electromagnetic wave demodulation control data is determined to be the third infrared carrier data according to the preset electromagnetic wave demodulation data.

The processor 13 is further configured to determine the electromagnetic wave demodulation control data as the second infrared carrier data, if the two electromagnetic wave demodulation data are the second infrared carrier data and the third infrared carrier data, and the infrared receiver 111 that receives the infrared signal is the first infrared receiver 1111.

When the first infrared receiver 1111 receives the second infrared signal and the third infrared signal, the two electromagnetic wave demodulation data are the second infrared carrier data and the third infrared carrier data, and the electromagnetic wave demodulation control data is determined to be the second infrared carrier data according to the preset electromagnetic wave demodulation data.

The processor 13 is further configured to determine the electromagnetic wave demodulation control data as the third infrared carrier data, if the two electromagnetic wave demodulation data are the second infrared carrier data and the third infrared carrier data, and the infrared receiver 111 that receives the infrared signal is the second infrared receiver 1112.

When the second infrared receiver 1112 receives the second infrared signal and the third infrared signal, the two electromagnetic wave demodulation data are the second infrared carrier data and the third infrared carrier data, and the electromagnetic wave demodulation control data is determined to be the third infrared carrier data according to the preset electromagnetic wave demodulation data.

The present disclosure is described below with an example of practical application.

Figure 4:
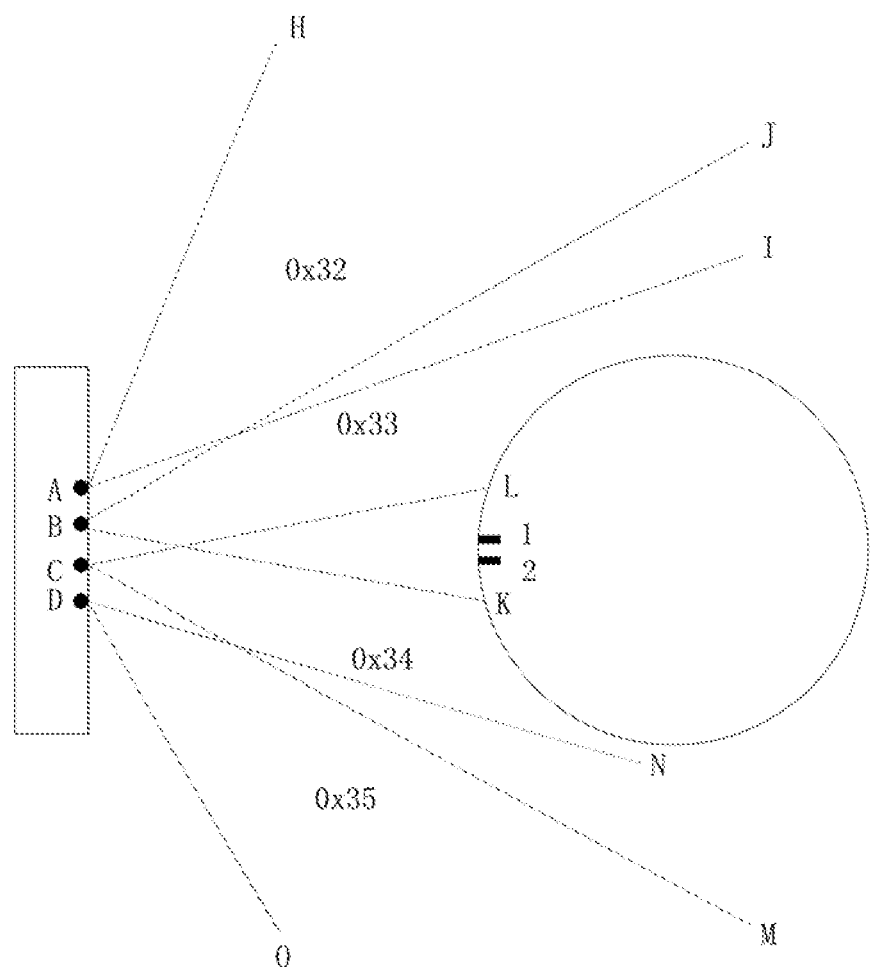
FIG. 4 is a schematic block of a practical application of the robot.

FIG. 4 is a schematic block of a practical application of the robot. As shown in FIGS. 4, A, B, C, and D are respectively four infrared transmitters located on a charging station, and the infrared carrier data of the corresponding coverage area are 0x32, 0x33, 034, and 0x35, respectively, where 0x32, 0x33, 034, and 0x35 are merely for illustrative purposes, and is not limited thereto.

As shown in FIG. 4, the included angle area between the dotted line AH and the dotted line AI is the first infrared signal transmitted by A, where the infrared carrier data is 0x32; the included angle between the dotted line BJ and the dotted line BK is the second infrared signal transmitted by B, where the infrared carrier data is 0x33; the included angle between the dotted line CL and the dotted line CM is the third infrared signal transmitted by C, where the infrared carrier data is 0x34; the included angle of the dotted line DN and the dotted line DO is the fourth infrared signal transmitted by D, where the infrared carrier data is 0x35.

In which, the included angle area of the dotted line AI and the dotted line BJ can simultaneously receive the infrared signals transmitted by A and B, which is the overlapping coverage area one; the included angle area of the dotted line BK and the dotted line CL can simultaneously receive the infrared signals transmitted by B and C, which is the overlapping coverage area two; the included angle area of the dotted line CM and the dotted line DN can simultaneously receive the infrared signals transmitted by C and D, which is the overlapping coverage areas three. The infrared receivers 1 and 2 are disposed on the chassis of the robot.

The process for the processor 13 to analyze and process the infrared carrier data is as follows.

First, the infrared receiver 1 or 2 receives the first infrared signal and the second infrared signal, where the two electromagnetic wave demodulation data are 0x32 and 0x33, and 0x32 is discard and 0x33 is selected according to the preset electromagnetic wave demodulated data. In this case, the controller 14 moves the robot 100 toward the direction of the infrared transmitter B corresponding to the electromagnetic wave demodulation data 0x33 until the robot 100 is docked at the external device 200.

Second, the infrared receiver 1 or 2 receives the third infrared signal and the fourth infrared signal, where the two electromagnetic wave demodulated data are 0x34 and 0x35, and 0x35 is discard and 0x34 is selected according to the preset electromagnetic wave demodulated data. In this case, the controller 14 moves the robot 100 toward the direction of the infrared transmitter C corresponding to the electromagnetic wave demodulation data 0x34 until the robot 100 is docked at the external device 200.

Third, the infrared receiver 1 receives the second infrared signal and the third infrared signal, where the two electromagnetic wave demodulated data are 0x33 and 0x34, and 0x34 is discard and 0x33 is selected according to the preset electromagnetic wave demodulated data. In this case, the controller 14 moves the robot 100 toward the direction of the infrared transmitter B corresponding to the electromagnetic wave demodulation data 0x33 until the robot 100 is docked at external device 200.

Fourth, the infrared receiver 2 receives the second infrared signal and the third infrared signal, where the two electromagnetic wave demodulated data are 0x33 and 0x34, and 0x33 is discard and 0x34 is selected according to the preset electromagnetic wave demodulated data. In this case, the controller 14 moves the robot 100 toward the direction of the infrared transmitter C corresponding to the electromagnetic wave demodulation data 0x34 until the robot 100 is docked at the external device 200.

In this way, the robot is facilitated to select the plurality of electromagnetic wave demodulation data, thereby making the docking process of the robot smoother.

Figure 5:
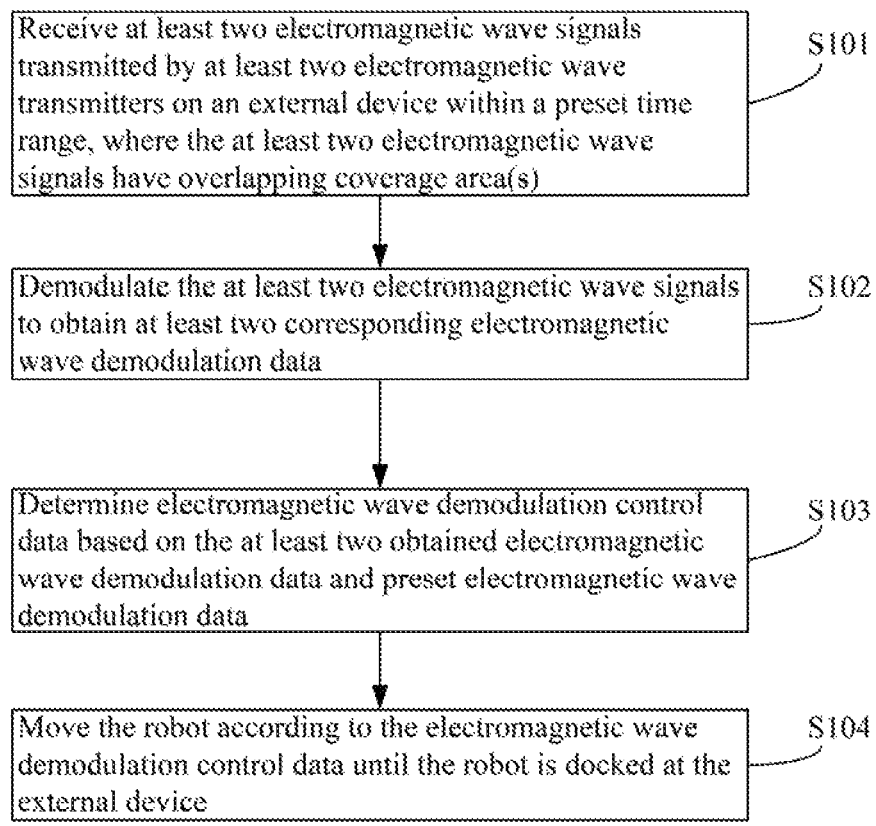
FIG. 5 is a flow chart of an embodiment of a data processing method for a robot according to the present disclosure.

FIG. 5 is a flow chart of an embodiment of a data processing method for a robot according to the present disclosure. In this embodiment, the method is a computer-implemented method executable for a processor, which may be implemented through a data processing apparatus for a robot. The motion control method is applied to a robot including an electromagnetic wave receiver, a demodulator coupled to the electromagnetic wave receiver, a processor coupled to the demodulator, and a controller coupled to the processor, where each of the electromagnetic wave receiver, the demodulator, the processor and the controller may be implemented in the form of hardware (e.g., a circuit), software (e.g., a program), or a combination thereof (e.g., a circuit with a single chip microcomputer). As shown in FIG. 5, the method includes the following steps.

S101: receiving at least two electromagnetic wave signals transmitted by at least two electromagnetic wave transmitters on an external device within a preset time range, where the at least two electromagnetic wave signals have overlapping coverage area(s).

S102: demodulating the at least two electromagnetic wave signals to obtain at least two corresponding electromagnetic wave demodulation data.

S103: determining electromagnetic wave demodulation control data based on the at least two obtained electromagnetic wave demodulation data and preset electromagnetic wave demodulation data.

S104: moving the robot according to the electromagnetic wave demodulation control data until the robot is docked at the external device.

The robot is moved according to the electromagnetic wave demodulation control data until the robot is docked at the external device, that is, an instruction of the external device 200 is completed. In one embodiment, the external device is a charging device, and instruction of the charging device is to cause the robot to dock at the charging device, so as to facilitate charging the robot.

In this embodiment, step S101 is implemented through the electromagnetic wave receiver of the robot, step S102 is implemented through the demodulator of the robot, step S103 is implemented through the processor of the robot, and step S101 is implemented through the controller of the robot.

In this embodiment, the method includes: receiving at least two electromagnetic wave signals transmitted by at least two electromagnetic wave transmitters on an external device within a preset time range, where the at least two electromagnetic wave signals have overlapping coverage area(s); demodulating the at least two electromagnetic wave signals to obtain at least two corresponding electromagnetic wave demodulation data; determining electromagnetic wave demodulation control data based on the at least two obtained electromagnetic wave demodulation data and preset electromagnetic wave demodulation data; and moving the robot according to the electromagnetic wave demodulation control data until the robot is docked at the external device. Because when the at least two electromagnetic wave signals are received and demodulated within the preset time range to obtain the at least two corresponding electromagnetic wave demodulation data, the electromagnetic wave demodulation control data can be determined through the at least two electromagnetic wave demodulation data based on the preset electromagnetic wave demodulation data, so as to control the robot to move until the robot is docked at the external device.

In one embodiment, the electromagnetic wave transmitter is an infrared transmitter, the electromagnetic wave signal is an infrared signal, the electromagnetic wave receiver is an infrared receiver, and the electromagnetic wave demodulation data is an infrared carrier data.

In one embodiment, the amount of the infrared transmitters is four, the amount of infrared receivers is two, and the two infrared receivers are disposed on a chassis of the robot.

In one embodiment, the infrared transmitter includes a first infrared transmitter, a second infrared transmitter, a third infrared transmitter, and a fourth infrared transmitter; there is a first overlapping coverage area between a first infrared signal transmitted by the first infrared transmitter and a second infrared signal transmitted by the second infrared transmitter; there is a second overlapping coverage area between the second infrared signal transmitted by the second infrared transmitter and a third infrared signal transmitted by the third infrared transmitter; and there is a third overlapping coverage area between the third infrared signal transmitted by the third infrared transmitter and a fourth infrared signal transmitted by the fourth infrared transmitter.

In one embodiment, demodulated data corresponding to the first infrared signal is first infrared carrier data, demodulated data corresponding to the second infrared signal is second infrared carrier data, demodulated data corresponding to the third infrared signal is third infrared carrier data, and demodulated data corresponding to the fourth infrared signal is fourth infrared carrier data.

In one embodiment, the infrared receiver includes a first infrared receiver and a second infrared receiver.

The step S103 may include:
determining the electromagnetic wave demodulation control data as the second infrared carrier data, in response to the two electromagnetic wave demodulation data being the first infrared carrier data and the second infrared carrier data, and the infrared receiver that receives the infrared signal being the first infrared receiver or the second infrared receiver;
determining the electromagnetic wave demodulation control data as the third infrared carrier data, in response to the two electromagnetic wave demodulation data being the third infrared carrier data and the fourth infrared carrier data, and the infrared receiver that receives the infrared signal being the first infrared receiver or the second infrared receiver;
determining the electromagnetic wave demodulation control data as the second infrared carrier data, in response to the two electromagnetic wave demodulation data being the second infrared carrier data and the third infrared carrier data, and the infrared receiver that receives the infrared signal being the first infrared receiver; an
determining the electromagnetic wave demodulation control data as the third infrared carrier data, in response to the two electromagnetic wave demodulation data being the second infrared carrier data and the third infrared carrier data, and the infrared receiver that receives the infrared signal being the second infrared receiver.

The forgoing is merely embodiments of the present disclosure, and is not for limiting the scope of the present disclosure. The equivalent structure or equivalent process transformation made by using the specification and the drawings of the present disclosure or direct or indirect application to other related technologies should be all included in the scope of the present disclosure.

What is claimed is:
1. A robot comprising:
an electromagnetic wave receiver disposed on the robot, wherein the electromagnetic wave receiver is configured to receive at least two electromagnetic wave signals transmitted by at least two electromagnetic wave transmitters on a charging device within a preset time range, wherein the at least two electromagnetic wave signals have at least one overlapping coverage area;
a demodulator coupled to the electromagnetic wave receiver, wherein the demodulator is configured to demodulate the at least two electromagnetic wave signals received by the electromagnetic wave receiver to obtain at least two corresponding electromagnetic wave demodulation data;

a processor coupled to the demodulator, wherein the processor is configured to determine electromagnetic wave demodulation control data based on the at least two obtained electromagnetic wave demodulation data and preset electromagnetic wave demodulation data; and a controller coupled to the processor, wherein the controller is configured to move the robot according to the electromagnetic wave demodulation control data until the robot is docked at the charging device.

2. The robot of claim 1, wherein the electromagnetic wave transmitter is an infrared transmitter, the electromagnetic wave signal is an infrared signal, the electromagnetic wave receiver is an infrared receiver, and the electromagnetic wave demodulation data is infrared carrier data.

3. The robot of claim 2, wherein the amount of the infrared transmitters is four, the amount of the infrared receivers is two, and the two infrared receivers are disposed on a chassis of the robot.

4. The robot of claim 3, wherein the infrared transmitter comprises a first infrared transmitter, a second infrared transmitter, a third infrared transmitter, and a fourth infrared transmitter; there is a first overlapping coverage area between a first infrared signal transmitted by the first infrared transmitter and a second infrared signal transmitted by the second infrared transmitter; there is a second overlapping coverage area between the second infrared signal transmitted by the second infrared transmitter and a third infrared signal transmitted by the third infrared transmitter; and there is a third overlapping coverage area between the third infrared signal transmitted by the third infrared transmitter and a fourth infrared signal transmitted by the fourth infrared transmitter.

5. The robot of claim 4, wherein demodulated data corresponding to the first infrared signal is first infrared earner data, demodulated data corresponding to the second infrared signal is second infrared carrier data, demodulated data corresponding to the third infrared signal is third infrared carrier data, and demodulated data corresponding to the fourth infrared signal is fourth infrared carrier data;

the infrared receiver comprises a first infrared receiver and a second infrared receiver;

the processor is further configured to determine the electromagnetic wave demodulation control data as the second infrared carrier data, in response to the two electromagnetic wave demodulation data being the first infrared carrier data and the second infrared carrier data, and the infrared receiver that receives the infrared signal being the first infrared receiver or the second infrared receiver;

the processor is further configured to determine the electromagnetic wave demodulation control data as the third infrared carrier data, in response to the two electromagnetic wave demodulation data being the third infrared carrier data and the fourth infrared carrier data, and the infrared receiver that receives the infrared signal being the first infrared receiver or the second infrared receiver;

the processor is further configured to determine the electromagnetic wave demodulation control data as the second infrared carrier data, in response to the two electromagnetic wave demodulation data being the second infrared carrier data and the third infrared carrier data, and the infrared receiver that receives the infrared signal being the first infrared receiver; and the processor is further configured to determine the electromagnetic wave demodulation control data as the third infrared carrier data, in response to the two electromagnetic wave demodulation data being the second infrared carrier data and the third infrared carrier data, and the infrared receiver that receives the infrared signal being the second infrared receiver.

6. The robot of claim 1, wherein the controller is configured to move the robot toward a direction of the infrared transmitter from which the infrared signal corresponding to the electromagnetic wave demodulation control data is received until the robot is docked at the charging device.

7. A computer-implemented data processing method for a robot, comprising executing on a processor the steps of:

receiving at least two electromagnetic wave signals transmitted by at least two electromagnetic wave transmitters on a charging device within a preset time range, wherein the at least two electromagnetic wave signals have at least one overlapping coverage area;

demodulating the at least two electromagnetic wave signals to obtain at least two corresponding electromagnetic wave demodulation data;

determining electromagnetic wave demodulation control data based on the at least two obtained electromagnetic wave demodulation data and preset electromagnetic wave demodulation data; and moving the robot according to the electromagnetic wave demodulation control data until the robot is docked at the charging device.

8. The method of claim 7, wherein the electromagnetic wave transmitter is an infrared transmitter, the electromagnetic wave signal is an infrared signal, the electromagnetic wave receiver is an infrared receiver, and the electromagnetic wave demodulation data is infrared carrier data.

9. The method of claim 8, wherein the amount of the infrared transmitters is four, the amount of the infrared receivers is two, and the two infrared receivers are disposed on a chassis of the robot.

10. The method of claim 9, wherein the infrared transmitter comprises a first infrared transmitter, a second infrared transmitter, a third infrared transmitter, and a fourth infrared transmitter; there is a first overlapping coverage area between a first infrared signal transmitted by the first infrared transmitter and a second infrared signal transmitted by the second infrared transmitter; there is a second overlapping coverage area between the second infrared signal transmitted by the second infrared transmitter and a third infrared signal transmitted by the third infrared transmitter; and there is a third overlapping coverage area between the third infrared signal transmitted by the third infrared transmitter and a fourth infrared signal transmitted by the fourth infrared transmitter.

11. The method of claim 10, wherein demodulated data corresponding to the first infrared signal is first infrared carrier data, demodulated data corresponding to the second infrared signal is second infrared carrier data, demodulated data corresponding to the third infrared signal is third infrared carrier data, and demodulated data corresponding to the fourth infrared signal is fourth infrared carrier data;

the infrared receiver comprises a first infrared receiver and a second infrared receiver;

wherein the step of determining the electromagnetic wave demodulation control data based on the at least two obtained electromagnetic wave demodulation data and the preset electromagnetic wave demodulation data comprising:
determining the electromagnetic wave demodulation control data as the second infrared carrier data, in response to the two electromagnetic wave demodulation data being the first infrared carrier data and the second infrared carrier data, and the infrared receiver that receives the infrared signal being the first infrared receiver or the second infrared receiver;
determining the electromagnetic wave demodulation control data as the third infrared carrier data, in response to the two electromagnetic wave demodulation data being the third infrared carrier data and the fourth infrared carrier data, and the infrared receiver that receives the infrared signal being the first infrared receiver or the second infrared receiver;
determining the electromagnetic wave demodulation control data as the second infrared carrier data, in response to the two electromagnetic wave demodulation data being the second infrared carrier data and the third infrared carrier data, and the infrared receiver that receives the infrared signal being the first infrared receiver; and
determining the electromagnetic wave demodulation control data as the third infrared carrier data, in response to the two electromagnetic wave demodulation data being the second infrared carrier data and the third infrared carrier data, and the infrared receiver that receives the infrared signal being the second infrared receiver.

12. The method of claim 7, wherein the step of moving the robot according to the electromagnetic wave demodulation control data until the robot is docked at the charging device comprises: moving the robot toward a direction of the infrared transmitter from which the infrared signal corresponding to the electromagnetic wave demodulation control data is received until the robot is docked at the charging device.

13. A computer readable storage medium storing one or more computer programs, wherein the one or more computer programs comprise:
instructions for receiving at least two electromagnetic wave signals transmitted by at least two electromagnetic wave transmitters on a charging device within a preset time range, wherein the at least two electromagnetic wave signals have at least one overlapping coverage area;
instructions for demodulating the at least two electromagnetic wave signals to obtain at least two corresponding electromagnetic wave demodulation data;
instructions for determining electromagnetic wave demodulation control data based on the at least two obtained electromagnetic wave demodulation data and preset electromagnetic wave demodulation data; and
instructions for moving the robot according to the electromagnetic wave demodulation control data until the robot is docked at the charging device.

* * * * *